US011533365B2

United States Patent
Tsao

(10) Patent No.: US 11,533,365 B2
(45) Date of Patent: *Dec. 20, 2022

(54) SYSTEM AND METHOD FOR DISPLAYING AND OPERATING MULTI-LAYERED ITEM LIST IN WEB BROWSER WITH SUPPORTING OF CONCURRENT USERS

(71) Applicant: Sheng Tai (Ted) Tsao, Fremont, CA (US)

(72) Inventor: Sheng Tai Tsao, Fremont, CA (US)

(73) Assignee: STT WebOS, Inc., Fremont (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/411,556

(22) Filed: Aug. 25, 2021

(65) Prior Publication Data
US 2022/0021735 A1      Jan. 20, 2022

Related U.S. Application Data

(60) Continuation of application No. 16/857,041, filed on Apr. 23, 2020, now Pat. No. 11,146,635, which is a (Continued)

(51) Int. Cl.
*H04L 12/24* (2006.01)
*H04L 29/06* (2006.01)
(Continued)

(52) U.S. Cl.
CPC ........ *H04L 67/1097* (2013.01); *G06F 16/168* (2019.01); *H04L 41/0806* (2013.01);
(Continued)

(58) Field of Classification Search
CPC ............... H04L 29/08099; H04L 41/22; H04L 41/0253; H04L 41/08; H04L 41/018; H04L 12/2424; H04L 12/2458
See application file for complete search history.

(56) References Cited

U.S. PATENT DOCUMENTS 5,897,638 A * 4/1999 Lasser ................. G06F 16/1774
707/999.102
6,147,687 A * 11/2000 Wanderski ............ G06F 16/289
715/966

(Continued)

FOREIGN PATENT DOCUMENTS

WO     WO-2002048866 A3 * 1/2004 .......... G06F 11/3495

*Primary Examiner* — Tom Y Chang

(57) ABSTRACT

Remotely access computing resources had been a major challenge to many information technology (IT) vendors. For example, the traditional remote file system access products such as network file system (NFS) and message block (MSB) all cannot be used for web based accessing across global due to both of them demanding huge computing powers and network bandwidth. For other example, traditional web based remote files and folders accessing products such as Yahoo Briefcase and VMWare ESX Server 2.0 all cannot support operations such as move or copy a file from one folder into another due to both of them only can display two levels for a file system, thus only can operate files and folders within one flat level. This invention has overcome the problems had occurred in the traditional accessing of remote computing resources by introducing a method and apparatus for creating multi-layered item list to mirror computing resources. The use of the multi-layered item list has effectively reduced the requirement of computing power and network bandwidth and also provides user to operate computing resources at two or more levels by controlling displaying two more levels of the computing resources.

20 Claims, 13 Drawing Sheets

Related U.S. Application Data continuation of application No. 16/102,180, filed on Aug. 13, 2018, now Pat. No. 10,686,664, which is a continuation of application No. 15/201,828, filed on Jul. 5, 2016, now Pat. No. 10,079,726, which is a continuation-in-part of application No. 13/932,277, filed on Jul. 1, 2013, now Pat. No. 9,449,009, which is a continuation of application No. 13/050,871, filed on Mar. 17, 2011, now Pat. No. 8,589,527, which is a division of application No. 11/374,302, filed on Jul. 2, 2004, now Pat. No. 7,945,652.

(51) Int. Cl.

| | |
|---|---|
| *H04L 67/1097* | (2022.01) |
| *H04L 41/08* | (2022.01) |
| *H04L 41/5054* | (2022.01) |
| *H04L 41/0806* | (2022.01) |
| *G06F 16/16* | (2019.01) |
| *H04L 41/0893* | (2022.01) |
| *H04L 45/02* | (2022.01) |
| *H04L 65/403* | (2022.01) |
| *H04L 41/12* | (2022.01) |
| *H04L 67/51* | (2022.01) |
| *H04L 41/22* | (2022.01) |
| *H04L 41/0253* | (2022.01) |
| *H04L 41/00* | (2022.01) |
| *H04L 41/0213* | (2022.01) |
| *H04L 41/0266* | (2022.01) |
| *H04L 41/082* | (2022.01) |
| *H04L 43/00* | (2022.01) |
| *H04L 67/02* | (2022.01) |
| *H04L 67/025* | (2022.01) |

(52) U.S. Cl.
CPC ...... *H04L 41/0879* (2013.01); *H04L 41/0893* (2013.01); *H04L 41/12* (2013.01); *H04L 41/5054* (2013.01); *H04L 45/04* (2013.01); *H04L 65/403* (2013.01); *H04L 67/51* (2022.05); *H04L 41/00* (2013.01); *H04L 41/0213* (2013.01); *H04L 41/0253* (2013.01); *H04L 41/0266* (2013.01); *H04L 41/08* (2013.01); *H04L 41/082* (2013.01); *H04L 41/22* (2013.01); *H04L 43/00* (2013.01); *H04L 67/02* (2013.01); *H04L 67/025* (2013.01)

(56) References Cited

U.S. PATENT DOCUMENTS

| | | | | |
|---|---|---|---|---|
| 6,330,560 | B1 * | 12/2001 | Harrison | H04L 63/10 709/219 |
| 6,567,849 | B2 * | 5/2003 | Ludovici | H04L 41/0253 709/221 |
| 7,035,857 | B2 * | 4/2006 | Reeves | H04L 41/0879 707/999.009 |
| 7,082,464 | B2 * | 7/2006 | Hasan | H04L 41/082 709/202 |
| 7,340,446 | B2 * | 3/2008 | Rajarajan | G06F 16/83 709/224 |
| 8,166,101 | B2 * | 4/2012 | Shah | G06F 16/284 711/173 |
| 2002/0002607 | A1 * | 1/2002 | Ludovici | H04L 41/0253 709/223 |
| 2002/0052941 | A1 * | 5/2002 | Patterson | H04L 41/22 709/222 |
| 2003/0131113 | A1 * | 7/2003 | Reeves | H04L 41/0879 709/229 |
| 2005/0216860 | A1 * | 9/2005 | Petrov | H04L 41/5058 715/810 |
| 2005/0229154 | A1 * | 10/2005 | Hiew | G06F 8/34 717/110 |

* cited by examiner

Fig. 3)

SYSTEM AND METHOD FOR DISPLAYING AND OPERATING MULTI-LAYERED ITEM LIST IN WEB BROWSER WITH SUPPORTING OF CONCURRENT USERS

PRIORITY AND CROSS REFERENCES

This is a continuation application of the patent application Ser. No. 16/857,041 filed on Apr. 22, 2020 which itself is a continuation of U.S. patent application Ser. No. 16/102,180 filed on Aug. 13, 2018 and now a U.S. patent Ser. No. 10/686,664, which itself is a continuation of application Ser. No. 15/201,828 filed on Jul. 5, 2016 and now a U.S. patent Ser. No. 10/079,726, which itself is a continuation of U.S. patent application Ser. No. 13/932,277 file on Jul. 1, 2013 and now a U.S. Pat. No. 9,449,009, which itself is a continuation of U.S. patent application Ser. No. 13/050,871 filed on Mar. 17, 2011 and now a U.S. Pat. No. 8,589,527, which itself is a continuation of U.S. application Ser. No. 11/374,302 filed on Jul. 2, 2004, converted from provisional application No. 60/585,552, and now is a U.S. Pat. No. 7,945,652. The application Ser. No. 11/374,302 has referenced U.S. patent application Ser. No. 10/713,904 converted on Jul. 22, 2003 from provisional application 60/401,238 which filed on Aug. 6, 2002 with a title of "Concurrent Web Based Multi-Task Support for Control Management System" and now is a U.S. Pat. No. 7,418,702. The application Ser. No. 11/374,302 has also referenced the U.S. patent application Ser. No. 10/713,905 converted on Jul. 22, 2003 from provisional application 60/402,626 which filed on Aug. 12, 2002 with a title of "IP based Distributed Virtual SAN", and now is a U.S. Pat. No. 7,379,990. All above mentioned applications and patents are herein incorporated by reference in their entireties for all purposes.

BACKGROUND OF THE INVENTION

Field of Invention

This invention is in the area of network communication, and particularly related to multiple users concurrently interacting with multiple computers to display, view, access, operate various resources by using mirrored multi-layers items list ("WLIL" also known as "hierarchical list") in a web-browser in a central controlled distributed scalable virtual machine environment. In addition, the present invention is also related to methods and apparatus of constructing a web-based computer user work (operation) environment. A portion of the disclosure of this patent document contains material which is subject to copyright protection. The copyright owner has no objection to the facsimile reproduction by anyone of the patent document of the patent disclosure as it appears in the U.S. Patent and Trademark Office patent files or records, but otherwise all copyright rights whatsoever. Copyright STT WebOS, Inc.

Description of Related Art

The evolution of computer working environment has changed from paper tape or punch cards of early years to a command line user work environment in the late 70th, and further to window based environment on a native system in the middle 80$^{th}$. In the window environment of earlier 90th, Windows Explore was created for displaying hierarchical list to represent and operate resource structure of a computing system. This provides user an efficient way for accessing resources, such as accessing files and folders of a file system. However, the traditional displaying of the hierarchical list for operating a resource structure, e.g. a file system, is directly using metadata of the resource structure. This actually will hug larger amount of computing power and result slow access to the resource structure, especially when the resource structure is deeply nested. Therefore, applications like Windows Explore was not successfully used in cross glob network environment because of hugging huge computing power and demand huge network bandwidth. There are applications providing network based work environment in the middle and later 90$^{th}$ such as Microsoft's terminal service, the Telnet of Unix & Linux system. These applications allow users to access and operate a target system from another system remotely and there are some network management applications focuses on monitoring targeted systems' network activities. However, they are limited in mobility because they need to install specialized software on user device instead of using web browser.

There are web-based applications that allow users to access service provided by web server. However, the web services are designed with very limited capability. For example, Yahoo's web services of Briefcase for remote access document in a folder structure only can display two levels of the folder structure and can be operated one level at any time. Thus, many critical operations such as copy or move files or subfolder between two folders can not be provided to users with Briefcase. There are other types of web-based application that allow people to manage a system remotely, by dump entire data of a local computer user work environment in a terminal screen buffer of a computing system to a web browser on a remote system that will create tremendous data load on a network. Thus, there is a need for creating a new web based user-friendly environment to overcome above mentioned problems, so that users can concurrently access and manage resources with ease and efficiency by using hierarchical list, yet to overcome the problem in the traditional use of the hierarchical list mentioned above.

SUMMARY

This section summarizes some aspects of the present disclosure and briefly introduces some aspects in preferred embodiments. Simplifications or omissions in this section as well as in the abstract or the title of the present disclosure may be made to avoid obscuring the purpose of this section, the abstract and the title. Such simplifications or omissions are not intended to limit the scope of the present disclosure.

Generally speaking, the present invention is related to a user-friendly environment that users can concurrently access and manage resources with ease. According to one aspect of the present invention, a web-based computer user working environment (herein "WCUWE") is disclosed. Some aspects of the WCUWE are described in co-pending U.S. application Ser. Nos. 10/713,904 and 10/713,905, both of which are hereby incorporated by reference in each one's entirety. A central-controlled distributed scalable virtual machine (herein "CCDSVM") is formed to achieve and realize a flexible working environment for users of the CCDSVM. The WCUWE of the CCDSVM provides a mechanism e.g. providing mirrored multi-layered item list and others, for users to access and operate the provisioned systems of a CCDSVM from any web browser on any remote system or devices with ease. With the capability of expanding a CCDSVM across the Intranet and Internet and with its strong security control, the WCUWE can meet the increasing demand for a more secure, more mobilized, more flexible and more cost saving computational solution.

BRIEF DESCRIPTION OF THE FIGURES

These and other features, aspects, and advantages of this invention will become better understood with regard to the following description, appended claims, and accompanying drawings where:

DETAILED DESCRIPTION OF THE INVENTION

Figure 1:
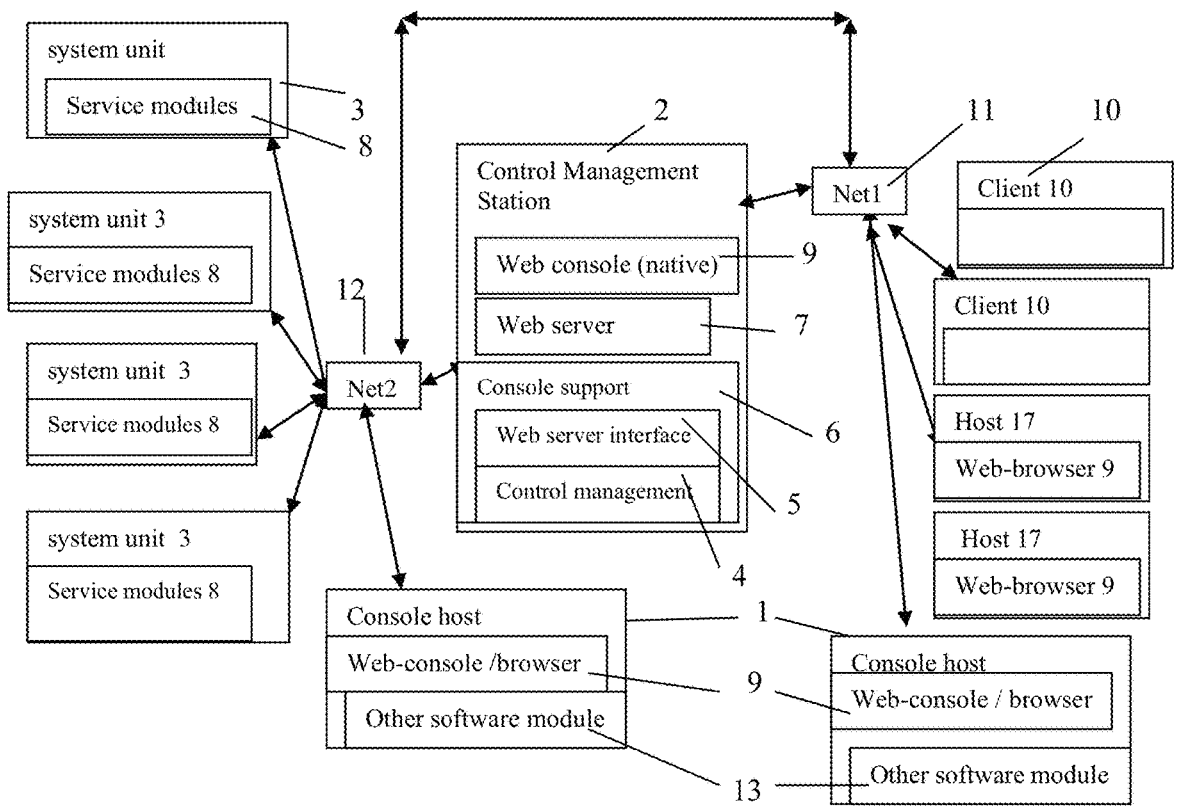
FIG. 1 shows a system view of a CCDSVM according to one embodiment of the present invention.

The detailed description of the invention is presented largely in terms of procedures, steps, logic blocks, processing, and other symbolic representations that directly or indirectly resemble the operations of data processing devices. These process descriptions and representations are typically used by those skilled in the art to most effectively convey the substance of their work to others skilled in the art. Numerous specific details are set forth in order to provide a thorough understanding of the present invention. However, it will become obvious to those skilled in the art that the invention may be practiced without these specific details. In other instances, well known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

For the convenience of describing some embodiment of this invention, the following terminologies are provided within the scope of this invention.

CCDSVM:

The CCDSVM is an abbreviation for central controlled distributed scalable virtual machine. A CCDSVM is configured to allow a control management system to control a group of computing systems and provide distributed services to client systems in a Intranet, the Internet or in a local area network (LAN) environment. The software components of the CCDSVM form a virtual operating environment or system.

Computer User Working Environment (CUWE):

Every computer system provides an end user a working environment (CUWE), which usually runs on top of a generic operating system. The CUWE allows a user to setup an authentication profile for each different user, to configure system resources from storage, network, file system, file and folder structure, files and all other available resources on a system, to monitor system activities, to access applications, and to manage data files such as moving data from one folder to another folder or moving data from one system to another system. Specially, a CUWE is configured to provide a multi-task mechanism. Therefore, a user can perform multiple tasks concurrently after they successful log in the CUWE.

Web Based Computer User Work Environment (WCUWE):

The web-based computer user work environment (WCUWE) of this invention runs on top of a generic operating system, for a single or multiple computers. It allows one or more users to work on one or more computer systems through a conventional web-browser either remotely or locally, from a system such as web browser on a laptop computer, a PDA, or a desktop computer. It provides great mobility and flexibility to the user(s). With this web-based computer user work environment, the entire CCDSVM system can be operated like a single virtual machine.

The Resources:

In general, resources on a computer or other electronic device refer to CPU, memory, storage device, network device, monitor or other display devices, keyboard, mouse, photo or video record devices, wireless device, user authentication profiles, and various form of data in storage. The data in storage could be a file system structure, folders, data files, formed raw data and others that are not limited to these in this invention. A data file can be in all kinds of form, such as plain text form, binary data form, PDF form, MPEG or JPEG form, or other various image data forms, MS power point data form or Word documentation form without limit. The storage could be hardware media such as hard disk drive, magnetic tape drive, various form of memory devices, or others suitable media, which shall not limit the scope of storage mentioned in this invention. In addition, it should be noted, unless specifically discussed, whenever a resource in a computer, a system or a device is discussed, it means any form of computing power, data, or capacity the computer, the system or the device has or able to access.

Standard Structured Information:

A web browser can interpret data in a standard structured format (formatted information) and display the data as web pages so that people can view, manipulate, and interact with the information. The standard formatted information is imposed and encoded by following the syntax of a programming language such as HTML (Hypertext Markup Language), XHTML, DHTML, XML, or any other various suitable languages, whichever is best to describe the structured information without limit. In practice, these languages (HTML, XML, . . . ) themselves are often referred as a standard format for web programming. Therefore, in this disclosure, it is not necessary to specify what standard is being used and as long as data or resources are presented in a way that is suitable for web communication.

Multi-Layered Item List (MLIL):

A multi-layered item list (MLIL) is a logically organized information list with certain order. Each entry or a node on an MLIL may represent (contain) a resource item after the entry or node being bound with attributes of the resource item. Specially, each of items on an MLIL may have or contain another layer of list of items, where each of the items may represent a physical resource or an information resource on computer systems or devices. For example, the information of files and folders of a file system on a modern computer system is typically organized as a multi-layers item list, so that the files and folders can be entirely viewed, displayed and operated in a UI window of a computer system supported by modern computer operating system. Likewise, each item (node) on an MLIL may be (or represent) a folder or a file. Actually, the information of computing systems or devices on a network, the information of hardware components on a system such disks, network cards, memory, and the information of users on a system can also be organized into an MLIL. The supporting of the MLIL in a WCUWE makes the system resources and information much easy to be displayed, viewed, and operated in a browser. In general, an MLIL contains at least one item (node) and as many as multiple hundreds items (nodes) with any number of layers as needed.

The System:

The system mentioned in this invention can be a desktop computer, laptop computer, various types of server computers, PDA, or cell phone or other devices with communication ability across a network without limit.

The OS (Operating System):

The operating system (OS) mentioned in this invention can be suitable operating system such as Windows, Linux, various Unix, real-time operating system and others without limit Programming Languages:

The programming languages, which used for implementing all software mentioned in this invention, could be any suitable languages or a combination of the suitable languages such as C, C++, Java, JavaScript, Visual Basic, C sharp, HTML, XML, DHTML, XHTML, and others without limit.

Communication Protocols:

The communication protocols to be used in the CCDSVM could be various types that are appropriate for transmitting required data across a communication network. The communication protocols could be IP-based or non-IP-based. The IP based protocols are built on top of IP protocol that could be standard protocols such as TCP protocol, UDP protocol, ICMP protocol, and others. The IP based protocols also can be non-standard proprietary protocols. The non-IP based protocols can be ISO 8473, ISO 8208, or serial communication, or data link layer protocols like LLC 802.2, or HDLC, or any proprietary protocols bellow the IP protocol level without limit The Communication Protocols for Web:

The communication protocols for web computing in this invention could be HTTP, SOAP, WAP, or others without limit The Web Browser. The web browser could be an existing commercial software from a vendor such as Microsoft IE, Netscape, Firefox, Mozillar, or other commercial or proprietary software. The web browser must be capable to handle web protocols such as HTTP, SAOP, WAP or others, and be able to interpret the standard structured formatted information such as web page without limit The Web Server Software:

The web server software mentioned in this invention could be a commercial software from a vendor such as Apache of open source foundation, IIS of Microsoft Corporation, or others on the market, and it also can be a proprietary software. The web server software must be able to handle web protocols such as HTTP, which is a protocol built on top of TCP protocol. Therefore, the structured information for web communication can be transmitted to said web browser across a communication link by the web server if the web server and web browser are located on two different systems or through inter-process communication if both of the web server and web browser are located on a same computing system.

User Session with the CCDSVM:

A user session is started at a time a user login (log on) to a CCDSVM from a web-browser and is ended at a time the user logout the CCDSVM from the same web browser. During a session, users can perform tasks which have been permitted by a security profile.

One of the objects, advantages, and benefits of this invention is to provide a web-based computer user work environment (WCUWE) which provides web based multi-task support and through automatically and dynamically provision to form one or multiple service pools in a cross-domain environment. With the WCUWE, the entire CCDSVM can be accessed and managed from a web-browser regardless where the users are located. In addition, the WCUWE permits multiple users, each from a web-browser to concurrently access and manage the CCDSVM with multi-tasking capability.

Since the emergence of window graphic user interface based computer user work environment (CUWE), users are able to display, view and operate data and hardware resources in a computer system or device by using a pointing device (e.g., a mouse). By clicking through a multi-layered item list, such as a file or folder list displayed in Microsoft Windows OS, a user can navigate to an item in any level in the list. In other words, supporting a multi-layered item list has become a critical part of window based computer user work environment. However, within the CCDSVM, how to let multiple concurrent users to effectively simultaneously display, view or operate an item list in a single web-browser for the available resources or data, such as for deeply nested files & folders or for multi groups of provisioned systems or devices or others. is an unprecedented challenge. This challenge has been successfully solved in this invention by creating and updating mirrored multi-layered item list in memory to mirror the resource structure on the mentioned system or devices.

Referring now to FIG. 1, it shows an example simplified block diagram of an embodiment of a typical CCDSVM, which includes:

Console Hosts (1):

A console host 1 can be a computing system on a network and by running suitable OS. However, it must have a web browser 9 installed, where the browser 9 can be used for accessing and operating the entire CCDSVM. The web-browser 9 can be implemented with suitable or a combination of suitable programming languages. One example of the browser 9 is the Internet Explorer (IE) from Microsoft Corporation. Optionally, Web-Console is another name for the web-browser 9 on a console host 1. From the web browser 9 by following a web URL link to another computing system or on the same system, a user can obtain a WCUWE and further access, manage and operate the entire system. The term of the web-console used sometimes is to indicate its ability to access system information and perform system operation in the CCDSVM by privileged users. A console host 1 may also include other software modules 13, which may be implemented with any suitable programming languages. These software modules 13 may communicate with a control management system 2 using IP based, non-IP based protocols or suitable protocols to receive or send data between the console host and the control management system 2. To support a non-web-based networked console, the software used for the console must handle protocols other than web protocols such as HTTP, SOAP, WAP or others and this software of the console host 1 must communicate with console supporting software 6 on the control management system 2. The console host 1 is similar to the client system 10 except it is dedicated to a user who takes a system administration role for the CCDSVM.

Control Management System:

The control management system 2 is a computing system on the network and can have suitable OS running on it. The control management system 2 includes web server software 7 and console supporting software 6. The console supporting software 6 includes web server interface software modules 5 and control management software modules 4. The control management system 2 may also have a web browser used as a web-console 9. The web server software 7 is configured to send data to and receive data from a web console 9 on a console host 1 or from a web-browser of client 10 based on HTTP or other suitable protocols for web contents delivery.

The console supporting software 6 and the web server 7 can be implemented with suitable or a combination of suitable programming languages. In one embodiment, the web server interface 5 of the console support software 6 may be extended to provide service as the web server software 7 does. In this case, there is no specialized web server software 7 needed.

System Unit:

The system unit 3 could be a computing system having a suitable OS running and containing service software modules 8, which are capable to communicate with other computing system on the network. For example, the service software modules 8 of the system unit 3 can communicate with the control management software 4 of the control management system 2 to carry out tasks for viewing or operating its resource and can also communicate with the client system 10 to deliver the required services, or to communicate with another system unit 3 to transfer data.

The service software modules 8 may include an individual software module dedicated to handle the HTTP protocol or other web protocols if there is a need for web-based communication with the client system 10 or other system unit 3 or the control management system 2. This individual software module could be commercially available web server software on the market or could be a proprietary software module.

Net1 11 is a network infrastructure of the Internet or a Intranet, or a local area network (LAN), or wide area network ("WAN") which provides communication links between the control management system 2 and the console-host 1 or the client system 10. It also provides communication link between the system unit 3 and the client system 10. The net1 may consist connection media such as connecting cable of Ethernet, optical Fibre, and other; such as wireless communication media for providing wireless communication links through air; and such as data bus on circuit board. The Net1 also consists of communication equipment such as switches, routers, and adapters. and all other possible elements of communication equipment.

The net2 (12) is also a network infrastructure of Internet or Intranet, or LAN or wide area network ("WAN"), which comprises similar connection media and equipment as the Net1 11 having and provides communication links between the control management system 2 and the system units 3 or the consoles host 1. It also provides the communication link between the system unit 3 and the client host 10.

Client Host:

The client hosts 10 are not part of the CCDSVM, but with the permission and authorization, they can get services from and access to the CCDSVM using the web-browser 9.

The data flows in the CCDSVM:

According to one embodiment, there are 4 basic data flow paths within a typical CCDSVM:

(1) Data path 1 is for data flow through a communication link between the web browser 9 on the client host 10 (or on the console host 1 or the control management system 2) and the web handling software on the control management system 2, such as web-server 7 and the console support software 6. With this path of data flow, whenever the user sends a request from the web-browser 9 to the web-server 7 and further down to the console support software 6, the console support software 6 collects all required information (i.e., metadata) from a target system and converts them into standard structured information for web communication. The targeted system could be the system unit 3 or the control management system 2. The information collected by the console support software 6 of the control management system 2 could be the system status, or the storage information, or the network information, or the user authentication profile, or the file system information or files and folders information and others on a target system. The collected information is not limited to these mentioned above in this invention. The console support software 6 passes this converted structured information to the web server software 7 and further transmits them to the web-browser 9 through communication link, net1 11 or net2 12, so that it can be displayed and viewed by the conventional web browser 9.

The communication protocol used between the web-browser 9 in the client host 10 or the console host 1 and the web server 7 in the control management system 2 could be HTTP or other suitable protocols for web communication, which could successfully transmit the data over the web.

(2) The data path 2 is the data flow through communication link between the control management system 2 and the system units 3.

With this path of data flow, the requests targeted to the system units 3 are passed from the console support software 6 of the control management system 2 to the service modules 8 of the system unit 3 through the communication link net2 12. If a result to those requests must return back to the control management system 2, the service modules 8 in the system unit 3 carry out the requests and then send the result back to the console support software 6 in the control management system 2. The communication protocol used between the console support software 6 in the control management system 2 and the service modules 8 of the system unit 3 can be suitable protocol for transmitting data between them. The typical data flow through this path could be a boot message, a system status, network information, or storage information in the system unit 3. It should be noted that the actual data flow though this path is not limited to those mentioned here.

(3) The data path 3 is the data flow through a communication link between the system units 3 and the client host 10 or the console host 1.

With reference to FIG. 1, in some cases, the console support software 6 of the control management system 2 may present a web link, pointing to an object on the system unit 3, to the user working on the web-browser 9 of the client host 10, or the console host 1, or the control management system 2. The object pointed at by the web link on the system unit 3 could be a file of text, mpeg video, PDF, MS power point or Word documentation or other that is not limited to these types. It could also be a link of another web service program. From the web browser 9, the user can directly access the information on the system unit 3 pointed at by the web link without going through the control management system 2 again. In this case, the service modules 8 of the system unit 3 must also include web server software to directly support the web browser 9 accessing as mentioned before.

(4) The data path 4 is data flow through a communication link between the system unit 3 and another system unit 3.

With this path, the service modules 8 in the system unit 3 can directly transmit data or information to the service modules 8 of another system unit 3 via the communication link net2 12 without going through the control management system 2. The communication protocol between the system units 3 could be IP-based or based on suitable non-IP-based protocol. The data and information transmitted through the path 4 can be in various type such as a data file. For example, a user on the web-browser 9 may navigate through a file folder on a system unit 3. Later, the user instructs to transfer a file from the file folder on the current target system unit 3 to another targeted system unit 3 by clicking, therefore, the data file will be transferred directly between two system units 3 without going through the control management system 2 again.

Figure 2A:
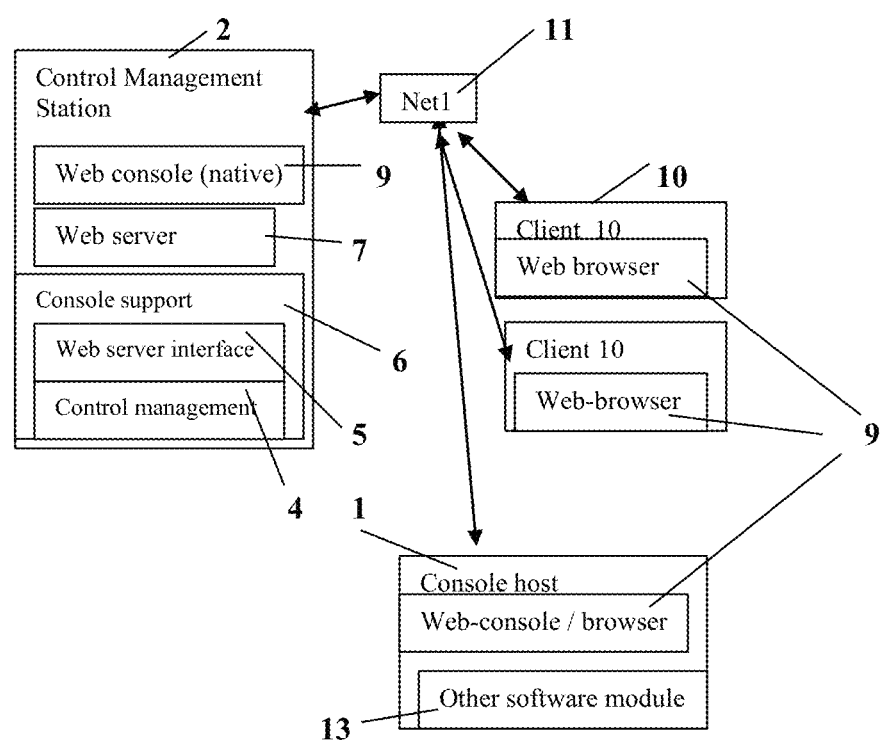
FIG. 2a shows an exemplary CCDSVM with a single control management system.
Figure 2:
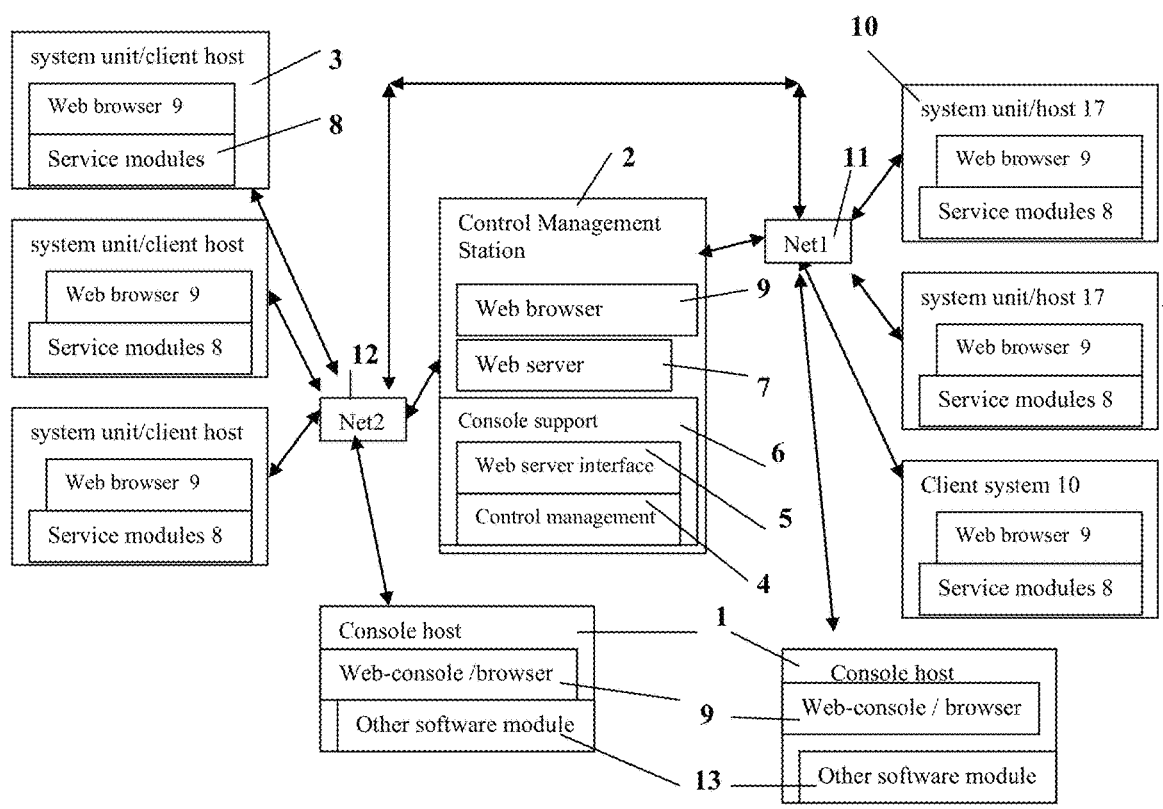
FIG. 2b shows an exemplary CCDSVM with identical client host and system unit.
FIG. 2c shows an exemplary CCDSVM with client hosts for non-web based accessing.
Figure 2:
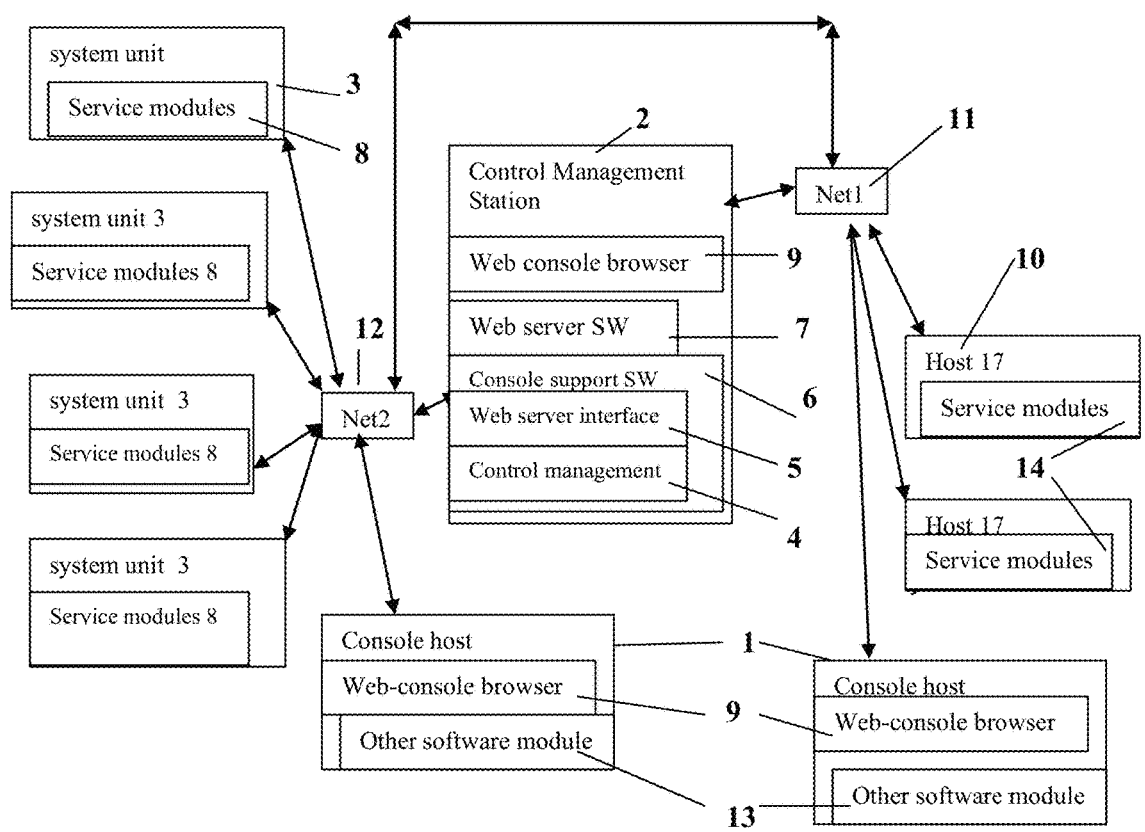

The Variation of the CCDSVM Configuration Models:

FIG. 2a shows a figure for an example of the CCDSVM with a single control management system 2. With this model, there is no any system unit 3, therefore, the CCDSVM degenerated into a single system and the WCUWE just works for the single system, which is the control management system 2. Thus, a user from the web-browser 9 of the console host 1, a client host 10, or a control management system 2 can access and operate the entire resources on the control management system 2.

FIG. 2b is a figure of an example of a CCDSVM with identical client host and system unit.

This model is substantially similar to the model of a typical CCSDVM shown in FIG. 1, except there is no difference between the client host 10 and the system unit 3 since each system unit is also configured with a web-browser 9 and each client host 10 is also configured with service modules 8. This means that each system unit/client shall play both roles of a system unit and a client host 10. With this model, a user on each system unit/client can login the control management 2 from the web-browser 9 and further access and operate the resources on the control management system 2, or on other system unit/client with security permission.

FIG. 2c is an example of the CCDSVM with non-web accessed client t 10. This model is substantially similar to the model of an exemplary CCDSVM shown in FIG. 1, except that the client host 10 has its own service modules 14 for non-web based access instead of using a web-browser for accessing. For example, if the system unit 3 is a SAN unit providing storage volumes, and one of the service modules 14 of the client host 10 is a driver routine for reading data from and writing data to a disk volume on the system unit 3 through communication with service modules 8 of the system unit 3. The client host 10 may also have a web-browser 9 to access the system unit 3 for other purposes except for accessing disk volumes.

Figure 3:
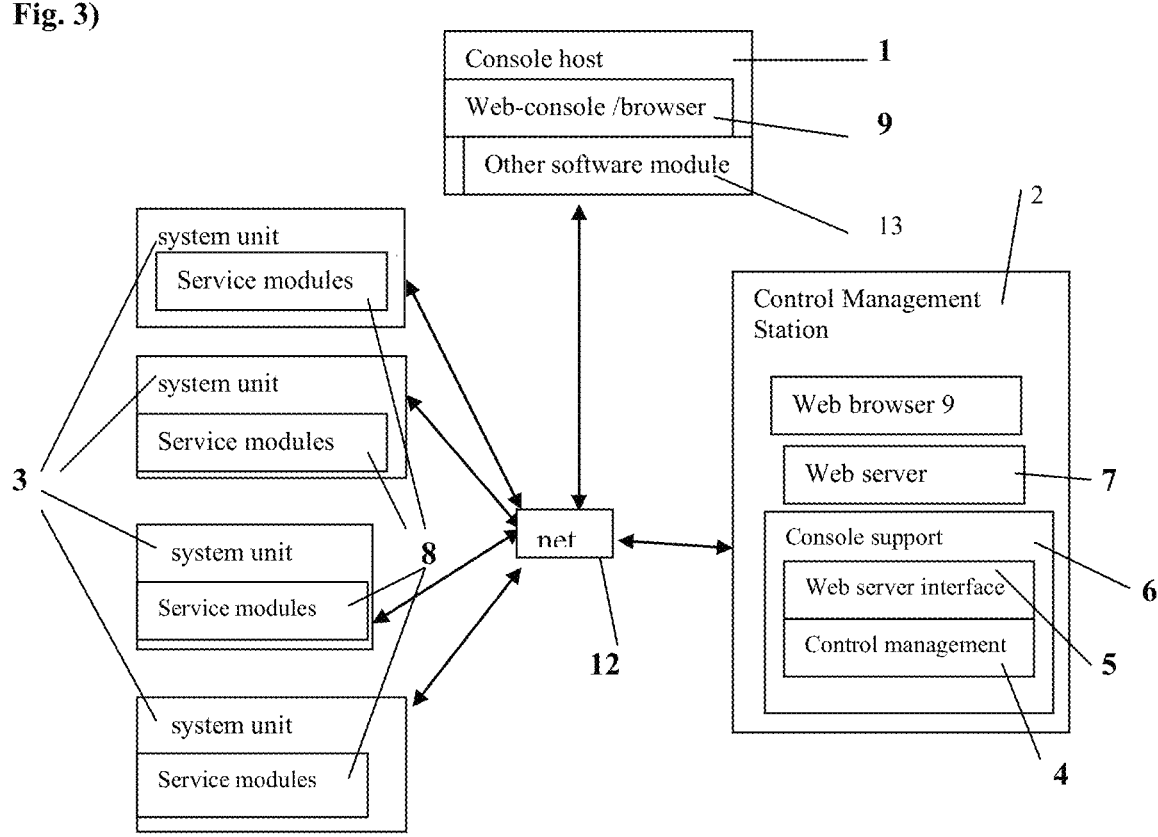
FIG. 3 is an example of functional block diagram of a WCUWE for the CCDSVM.

FIG. 3 shows an example of software modules of the WCUWE for a typical CCDSVM. The software modules of the WCUWE can be implemented with any suitable or a combination of suitable programming languages such C, C++, Java, JavaScript, Visual Basic, HTML, XML, etc., which means that software of the WCUWE is programming language independent. the software of the WCUWE may include following:

1) web server interface modules 5 of the console support software 6 on the control management system 2.
2) control management modules 4 of the console support software 6 on the control management system 2.
3) web server software 7 on the control management system. The web server software 7 could be commercially available web server software on the marketing such as Apache or MS IIS or others, and also could be proprietary software. If the web server interface modules 5 provide compatible functionality with the web server software 7, then the web server software 7 may not be needed.
4) service software modules 8 on the system unit 3. The service software modules 8 may include web server software 7 or a software module, which provide equivalent functionality as the web server software 7 does.
5) web browser 9 on the console host 1, on the control management system 2, or on the client host 10. The web browser 9 could be a commercial web browser on the market such as MS IE, or Netscape, and also could be proprietary software modules.

Figure 4:
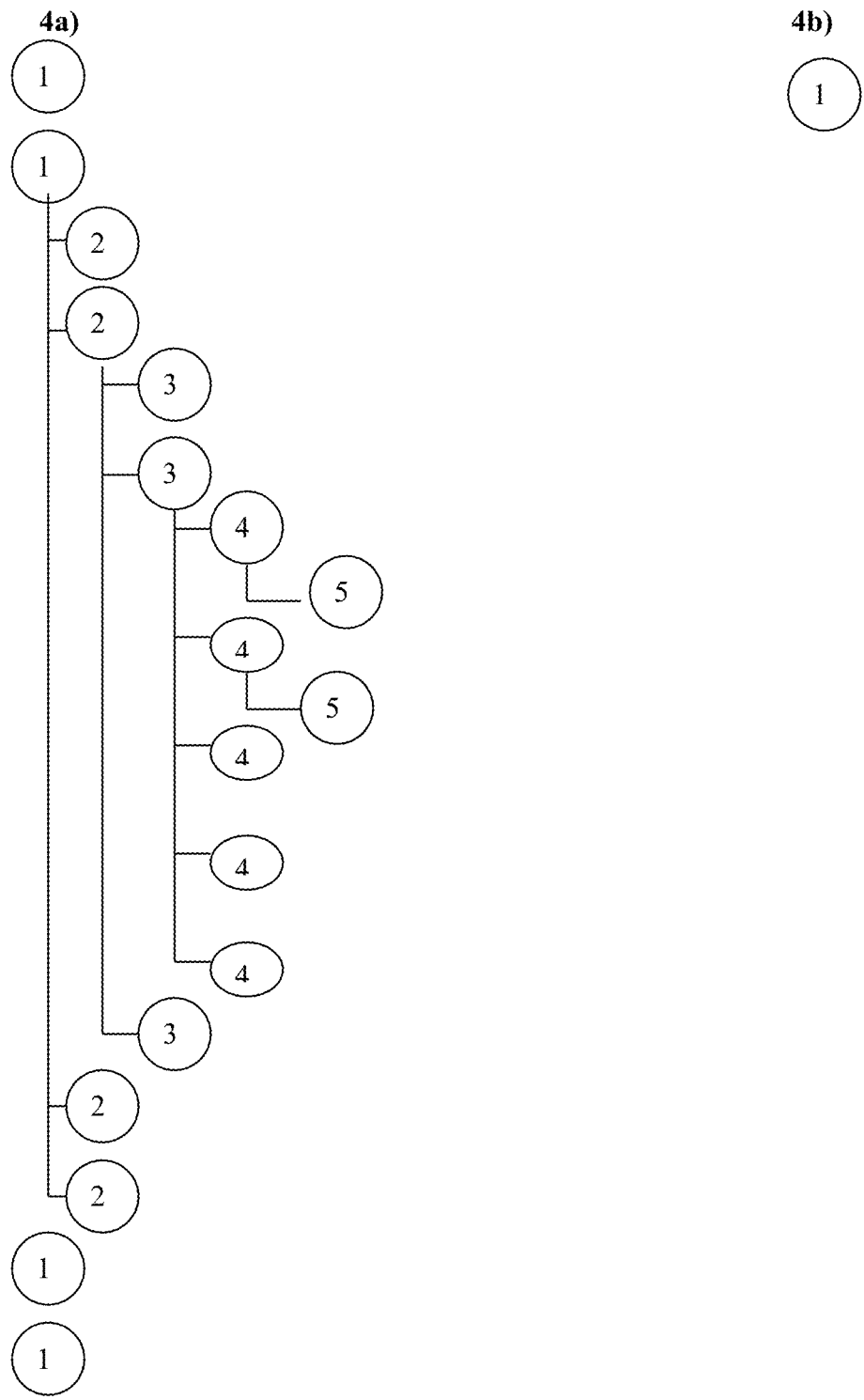
FIG. 4 shows a simplified example of a multi-layered item list (MLIL)

FIG. 4 shows simplified examples of a Multi-Layered Item list (MLIL).

FIG. 4a illustrates a multi-layered item list contains multiple nodes and multiple layers. A node on an MLIL can be expanded to display sub-node if there is any by clicking. The sub-nodes may be reduced by mouse clicking on the same node again.

FIG. 4b illustrates a degenerated Multi-layered items list containing a single node (i.e., a single layer).

Figure 5:
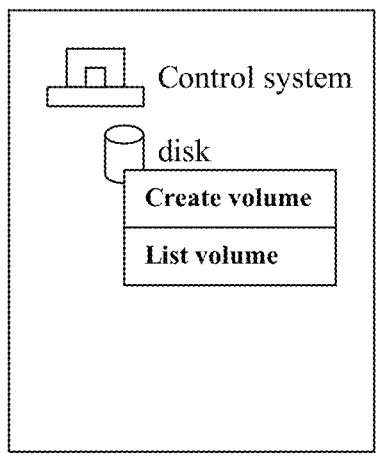
FIG. 5 a) and FIG. 5 b) show some examples of an operation menu for WCUWE.
Figure 5:
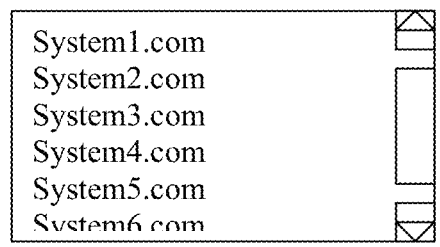

FIG. 5 shows simplified examples of operation menu for the WCUWE of the CCDSVM that includes:

FIG. 5a illustrates a web based drop-down menu for disk volume management. The drop-down menu can be invoked by right clicking on an item (node) on MLIL.

FIG. 5b illustrates a web based selective menu for system unit management, where each item can be selected for accessing via clicking submit button.

Figure 6:
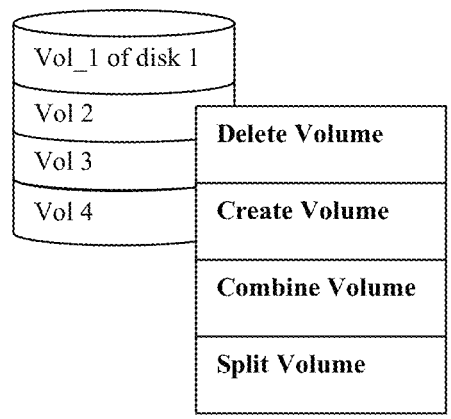
FIG. 6 a), FIG. 6 b) and FIG. 6 c) show an example of an operation menu for different types of nodes on MLIL.
Figure 6:
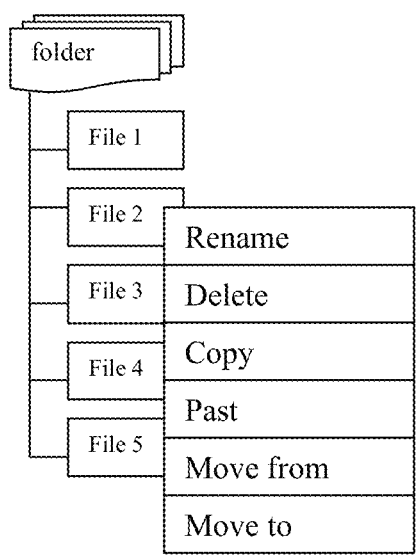
Figure 6:
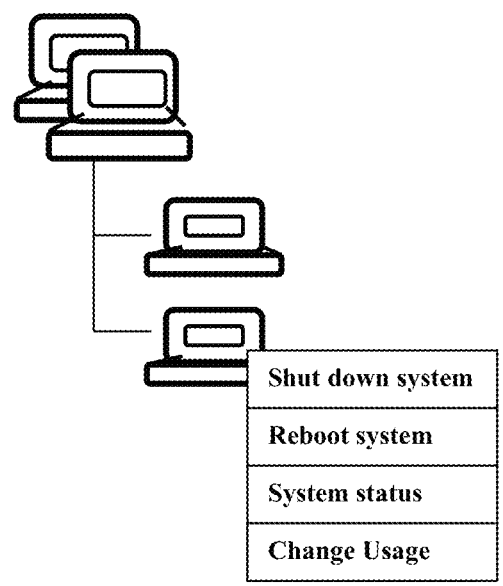

FIG. 6 shows simplified examples of operation menu for different types of node on an MLIL that includes:

FIG. 6a illustrates an operation menu for managing the storage (disk).

FIG. 6b illustrates an operation menu for managing the file.

FIG. 6c illustrates an operation menu to manage the system unit on network.

Figure 7:
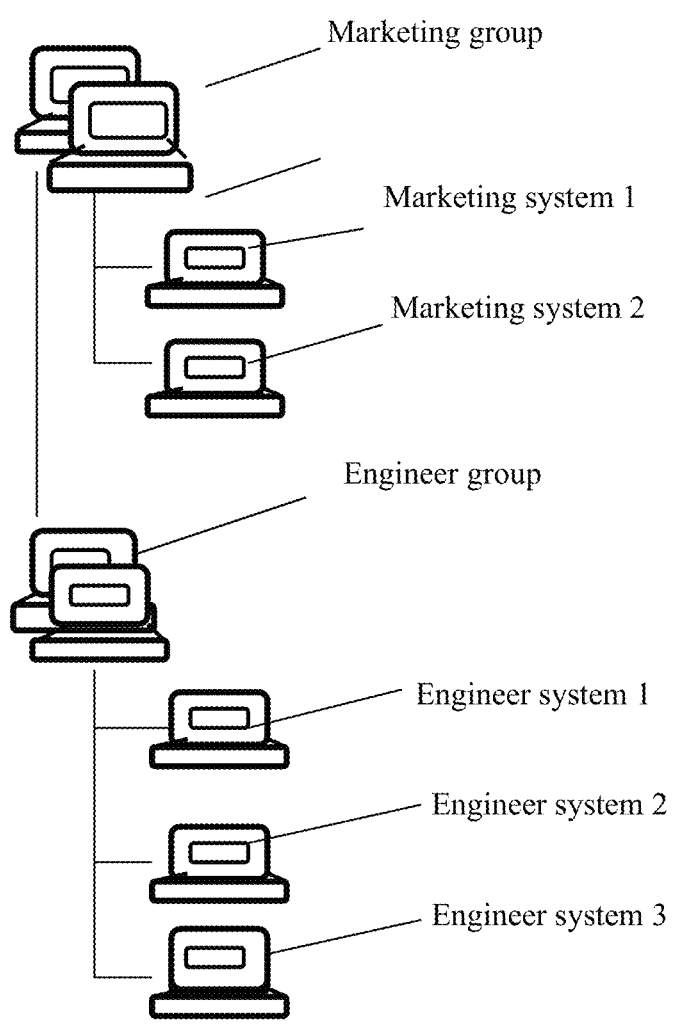
FIG. 7 shows an example of server units grouped by a group ID.

FIG. 7 shows an example of an MLIL displayed for system units grouped by group ID.

This figure shows one example of five system units being divided into two groups, including a marketing group and an engineer group. The marketing group contains 2 system units 3 while the engineer group contains 3 system units. The groups are automatically and dynamically formed when the system units boot up.

Figure 8:
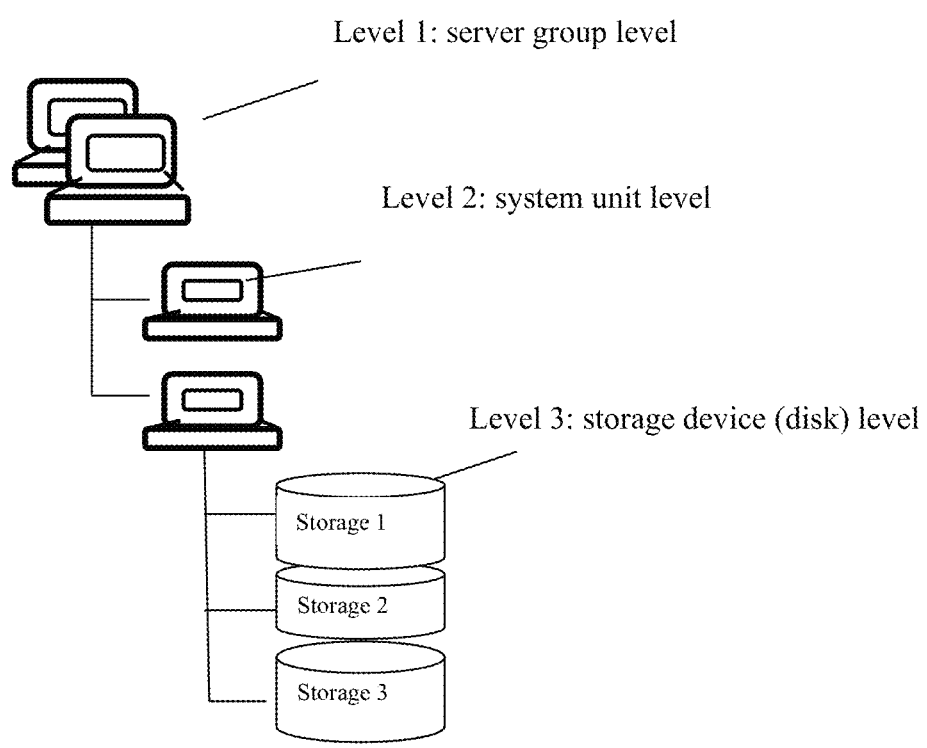
FIG. 8 a) and FIG. 8 b) show examples of a multi-layered item list (MLIL) with items from other devices, system units or groups.
Figure 8:
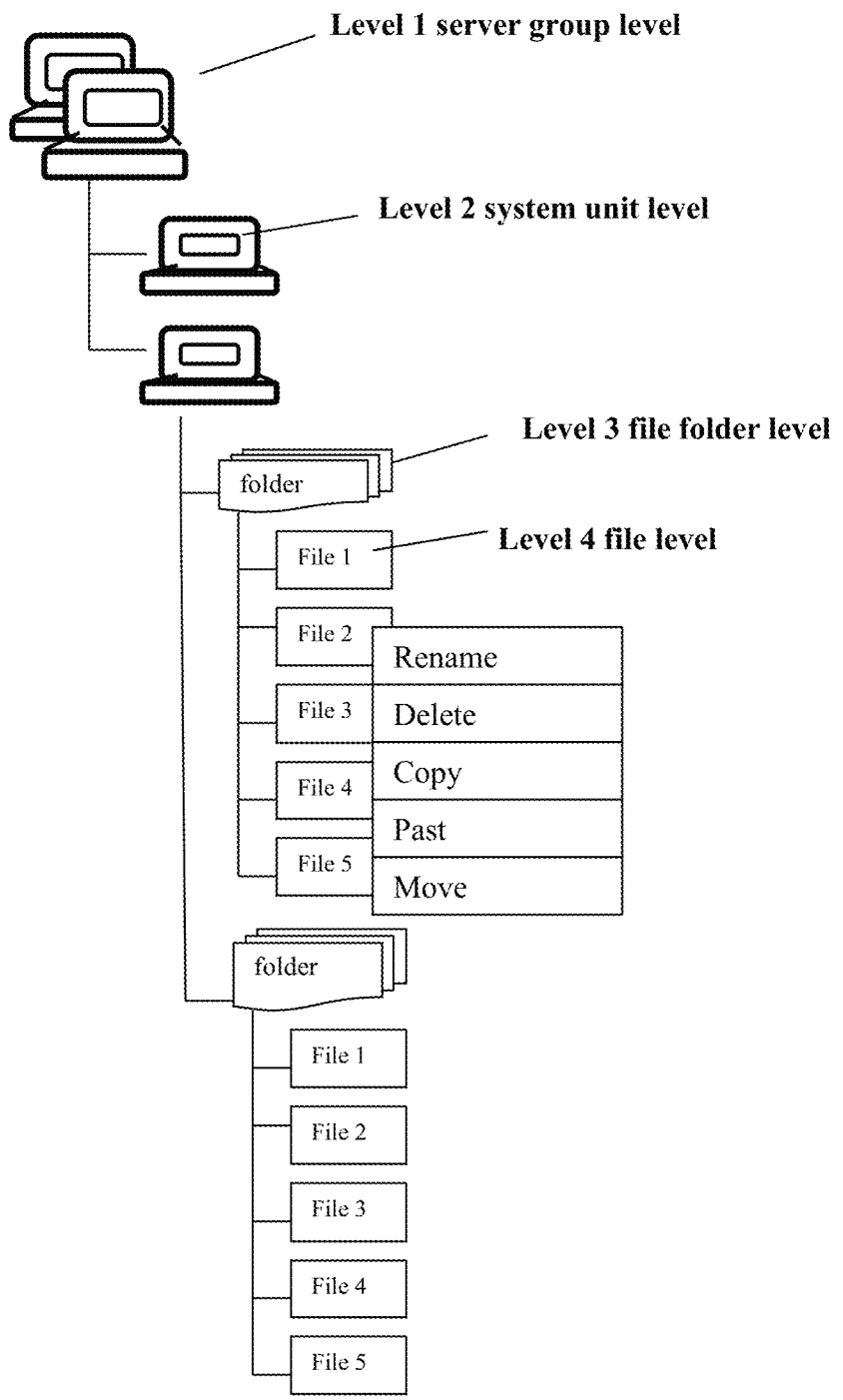

FIG. 8 shows an example of an MLIL combined with mixed devices, system units and system groups That includes:

FIG. 8a illustrates an example of the top level of an MLIL is for system group, the second level is for system units, the third level is for component devices such as disks.

FIG. 8b illustrates an example of a top level of an MLIL is for system group, the second level is for system units, the third level start for a file folder comprising files.

The Initiation of WCUWE:

The WCUWE can be established via a sequence of steps that are performed by the console support software 6 of the control management system 2 as below:

Referring back to FIG. 1, according to one embodiment, the console support software 6 collects all major resources information of the control management system 2 and converted the information to a standard structured format, which is viewable in the web-browser 9. The resources information mentioned above include the resources of the storage, network, file system, files, folders, users, system status and others, which can be collected whenever the control management system 2 is boot up or at an appropriate time. The resource information may be stored in memory for fast retrieve at later time and also may be stored on permanent storage such as disks.

The console support software 6 communicates with the service modules 8 of the system unit 3 to collect all major resources information of the system unit 3 through the communication links of net2. Further, the console support software 6 stores (binds) the collected information of the system units 3 as a network information on the control management system 2. In addition, upon users' accessing, the collected network information is organized and converted to a standard structured format for web communication, and subsequently is viewable in the web-browser 9. The collected network information includes the information of the system units 3 and their storage device, network devices, wireless devices, video and audio record & playback devices, file-system, users, system status and all others on net. The network information can be collected whenever each system unit 3 is boot up or at an appropriate time.

Further, the network information can also be maintained by the control management system 2 in memory for later fast access and can be organized as a suitable logical structure, for example as a simple list of array, a linked list, a double linked list, a hash table, a tree structure and others. The network information can also be stored on permanent storage such as disk or others for the backup purpose. In addition, the network information can be stored in different forms on permanent storage such as in the form of various commercial database, binary record file, flat text ASCII file or others. All specific example of the form of data depository or logical structure mentioned above are for illustration only, and they shall not be limited to these mentioned in this invention.

After the initiation of the WCUWE, each of the users is allowed to log in, from a web-browsers 9 to the CCDSVM and can concurrently display, view, access, & operate various resources and information of the CCDSVM.

Users Interaction, Access and Manage Resources with the WCUWE:

Users from the client host 10, the console host 1, or the control management system 2 can log into the WCUWE of the CCSDVM via a web URL link provided by the software of the WCUWE (see FIG. 3). The software of the WCUWE presents information and resources maintained on the control management system 2 and/or on the server units 3 to the users after their login from the web browser 9. Subsequently, whenever a user requests to access or operate a major resource either on the control management system 2 or the system unit 3 of the CCDSVM, the software modules of the WCUWE is configured to create a corresponding user task for the request to be accessed on the targeted system. For example, a task may be generated through selecting a node on a MLIL or through selecting an option from an operation menu. In one embodiment, the software of the WCUWE is configured to support multiple concurrent tasks for a user from a single web-browser 9 and also to support multiple concurrent users each from a web-browser 9 to perform such tasks while providing best security protection for the resources being accessed by the multiple users.

The Use of Multi-Layer Item List in the WCUWE

In order to provide convenience for each of the login users to perform tasks in the WCUWE, the console support software 6 may deploy a logical structure of multi-layer item list (MLIL) as illustrated in FIG. 4 together with the associated web-browser based operation menu as illustrated in FIG. 5 for operating corresponding actual multi-level organized resources. The resources as mentioned before could be the files, and folders of a file system, the system units 3 on the network, the users and their security profile and others as described before. If there is a need to create a structured multi-layer item list (MLIL) of FIG. 4 for mirroring the actual structured resources on systems of the CCDSVM upon each login user trying to access and operate, the console support software modules 6 of the control management system 2 are configured to do the following:

a) For each of user sessions of login users, a memory management module of the console support software 6 create an MLIL as illustrated in FIG. 4 for mirroring an actual resource structure. The MLIL can be flexibly expanded or reduced by (mouse) clicking while the MLIL is displayed in a web-browser. Further, the console support software 6 makes an association between each created MLIL and the actual targeted resources. The created MLIL can reside in memory and can be in a form of a list structure such as a simple array list, link list, double link list, various tree structure, or hashed table, or other.

b) For each created MLIL, binding a corresponding graphic or text representation of a resource to each node on the MLIL for the purpose of displaying it as indication of the resource, and associating each of the nodes with appropriate attributes. These attributes shall reflect the characteristics of an actual resource item. The attributes can be name, type, level, size, the total number of sub-nodes and so forth without limited to the mentioned above, therefore, the actual structured resources can be correctly displayed through the MLIL.

c) Link a corresponding operation menu to the MLIL. The operation menu can be either a web-based drop-down menu 1 as shown in FIG. 5 or a non-drop-down selective menu 2 as shown in FIG. 5.

d) Convert (encode) the created MLIL and all its associated information into the standard structured information (web page) for web communication, so that it can be viewable and accessible via the web-browser 9. Thereafter, the MLIL can be either viewed in a web-browser 9 on the control management system 2 or viewed by a web-browser 9 on the client host 10 or the console host 1. The converted logical multi-layered item list needs to be transmitted via a communication link net1 11 or net2 12 from the control management system 2 to the client host 10 or the console host 1. The converted logical multi-layered item list can be transmitted using a web protocol such as HTTP or any other suitable protocols in order for users remotely view it from the web-browser 9.

e) After user taking action of either viewing, or operating resources represented by the MLIL, the console support software 6 modifies the MLIL through the memory management module of the console support software 6. Also, the memory management module of the console support software 6 keeps tracks of the memory usage and status for the correspondent MLIL as the results of expanding or reducing the MLIL when a user accesses or operates a resource represented by this MLIL. For example, deleting of a file folder operation requires to delete an actual folder on a file system and delete a corresponding node on the MLIL. Most importantly, all processes or threads created to perform tasks of operating the resources represented by the MLIL can effectively share the dynamically modified MLIL with a consistent view throughout the each users' entire login session. The memory management module of the console support software 6 may need to translate and map the initial logical memory address of the MLIL to another logical memory address, therefore, the different processes or threads of the same user session can effectively access the same actual MLIL memory object during the user session, f) The steps described from b) to e) above can be repeatedly processed as long as a user keeps working on the same resource structure represented by this specific MLIL.

For each of logout users, the created MLIL for the user session will be deleted through the memory management module of the console support software 6. Further if a user stops accessing the current related resource and requests to access a total different resource, the original MLIL will be deleted and a new MLIL will be created.

The Support of Deeply Nested Files & Folders Lists on Systems within the WCUWE of the CCDSVM:

The accessing and managing a file system always has been an important part of a computer user work environment (CUWE) in the past. Supporting a file system to be accessed by users from a network has always being a challenge to many vendors. With this invention, a user can manage storage volumes of the entire CCDSVM from a web browser 9 and further can create, manage, and access the file system on either the control management system 2 or the system unit 3. With a sophisticate method of using the multi-layer item list as shown FIG. 4 together with the operation menu shown in FIG. 5 for the file system in the WCUWE of the CCDSVM of this invention, users can efficiently access and manage files and folders in the file system from a web-browser 9 on the fly without caching anything for the file system.

With this method, in one embodiment, the multi-layer item lists (MLIL) is used to represent an actual file folder structure of a file system on a target system of the CCDSVM, where a node (item) on the MLIL represents a folder or a file or the file system. When a user navigates through the file system and clicks on a node of the MLIL to operate a file or a folder from a web-browser 9, only a small piece of information, which is related to the file or folder, needs to be retrieved or transmitted between a target system of the CCDSVM and the control management system 2. For example, if a user wants to add or delete an item such as a folder, the only major information needs to be transmitted is the folder's name from the control management system 2 to the target system and the target system shall carry out the task. If a user wants to access the information, which is bellow a current item on the MLIL, such as a folder, after sending the folder name, the only information that needs to be retrieved from the target system is the sub-folder or file names if there is any under the current folder. If the user wants to set access permission for a file or a folder on any of target systems for one or more designated users to access, the target system information and file or folder information on the network need to be bound with each designated user's security profile. The target systems could be either the control management system 2 or any of the system units 3 in the CCDSVM.

If a user needs to view or edit the content of a file on a system unit 3, the file may be transmitted via the communication link net 1 & net 2 directly from the target system to the client host 10 or the console host 1, without going through the control management system 2. If the file is on the control management system 2 and users like to view or edit it from a remote system, the file is transmitted via the communication net 1 to the client host 10 or the console host 1. With a proper viewing tool on the client host 10 or the console host 1 or the control management system 2, which may be invoked from the web-browser 9, the user is able to view the contents of the file. With a proper editor, user can further edit the file and then transmit the file back to the target system. The target system could be either a system unit 3 or the control management system 2. Alternatively, the file may also be transmitted from the target system to the control management system 2 and then convert it from original format to a format, which may be viewed and edited in the web-browser 9. After converting, if the target system is not the control management system 2, the file can be transmitted via the communication link net 1 or net 2 from the control management system 2 to the client-host 10, the console host 1 for viewing or editing with a web-browser 9. If the target system is the control management system 2, there is no such transmission required.

The Support of the Automatically & Dynamically Provisioning Groups of Systems in the WCUWE of a CCDSVM:

Network information is an important part of the WCUWE. In one embodiment, the system (server) units 3 of the CCDSVM can be automatically and dynamically provisioned into one or multiple system groups (pools) based on their group ID and information about each of the system units 3, where each system group contains at least one system (server) unit 3 ("provisioned system"). Specially, the group ID is sent by each of the system units 3 via a packet to the control management system 2 across a network during boot time of each system unit 3.

In addition, the one or more of system groups (service pools) are automatically constructed via executing a service pool automatic construction protocol between a control management system 2 and each of the system units 3.

To effectively access and manage such grouped system units 3 and their associated devices, such as storage or network interface cards or terminal monitor or video & audio recorder (e.g., camcorder, or keyboard & mouse), or wireless devices or file systems on the network, the mirrored multi-layer item list (MLIL) can be used. Therefore, the mixed information on the network can be displayed in order with a top-down fashion such that each server group at top level, the system units 3 at the second level, and the hardware devices or file system start from the third level and so on within the MLIL.

More specifically, a node on the MLIL with different level or type may associate with a different type of operation menu. For example, a node of the system unit 3 on the MLIL may be associated with an operation menu containing options for monitoring system status, for performing system shutdown, storage management, or change usage etc. and a node of storage device may be associated with an operation menu for creating a storage volume, displaying storage volume, combine storage volume, and delete a storage volume and so on. After converting (encoding) all information associated with the MLIL into a standard structured format such as into a web page), the complex information on the network can be viewed and operated by a user from a web-browser 9.

Figure 9:
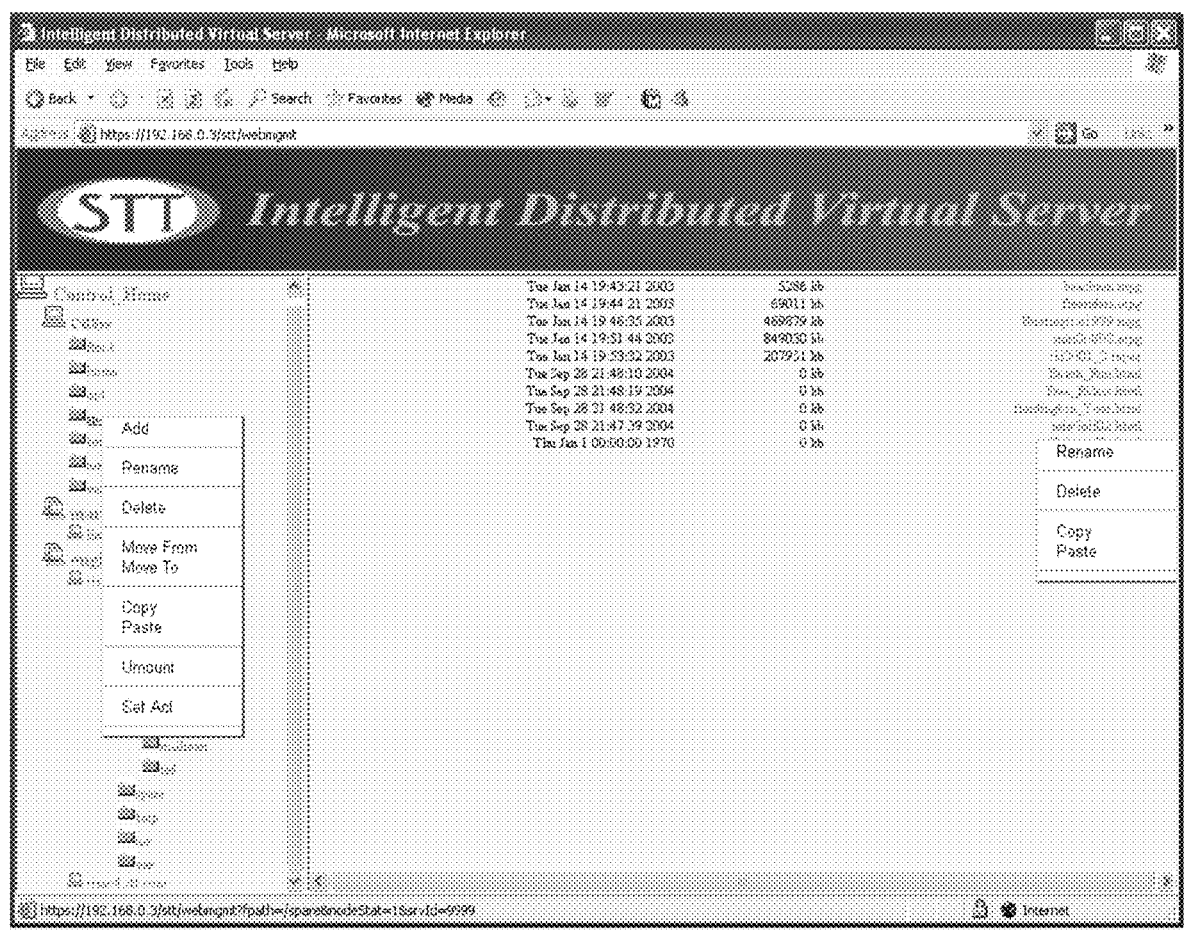
FIG. 9 illustrates an example of how does the file systems on a system unit in a system group can be accessed.

For example, FIG. 7 shows the example of each of the system units 3 being provisioned in multiple groups is represented by an MLIL. FIG. 8 shows the example of device such as storage configured under a server unit 3 in each system group represented by an MLIL. FIG. 9 shows an example of file system on a system unit 3 in a group can be accessed via an MLIL. The method of automatically and dynamically grouping each of the system units 3 and wisely using the MLIL to represent the diversified resources on the network, the entire CCDSVM can be much more efficiently accessed, operated, and managed. For example, through (mouse) clicking on a MLIL in a web-browser, privileged users can create storage volumes from a fresh disk on any target system and make a file system on a storage volume, mount the file system and create a folder structure on the file system, and further setup access control for user having limited privileges to access resources on the network. Therefore, the WCUWE can securely let permitted user access the resources from a web-browser anywhere on the network.

The Support of the User Administration & Authentication in WCUWE of the CCDSVM:

Initially, the WCUWE allows a default super user to login the WCUWE of the CCDSVM and to access an authentication web-page provided by the console support software 6. This privileged user can setup other privileged or non-privileged users account and their security profiles thereafter. In one embodiment, a user's profile comprises security attributes to determine the specific user is permitted to access from which remote system, to access which specific systems in a CCDSVM, to permit what specific types of tasks on that specific system, and to access what specific files or folders or applications. In addition, the security attributes can be encoded in a security data structure, which each field can be used to specify a unique characteristic security permission.

Similar to a file system in the WCUWE of the CCDSVM, the user profile can be viewed and operated with using an MLIL combined with a web-based operation menu, and further to convert it to a standard structure, which can be viewed and accessed by the user from a web-browser 9. Therefore, through (e.g. using mouse) clicking on the MLIL for user profiles and a web-based operation menu in a web page, the user can perform operations of user profile creating, viewing, updating, deleting and others. Specially, a privileged user can setup profiles for other non-privileged users for the secure access control. In addition, the user information and their security profiles can be kept in any form in a database, which could be a commercial database on the market, or a plaint text file, or a binary record file, or others.

The present invention has been described in considerable details with preference to certain preferred versions, examples, and figures; however, other versions, and samples are also possible. Therefore, the spirit and scope of the appended claims should not be limited to the description of the preferred versions and samples contained herein.

The invention claimed is:

1. A method implemented by a server for supporting remotely access information structure, comprising:

creating a hierarchical list in memory to mirror an information structure in a reduced form;
sending the hierarchical list to a remote user device for being displayed thereon;
processing a task in response to a user through the hierarchical list displayed on the user device performing the task of accessing the information structure that includes:
updating the information structure and updating the hierarchical list in the memory to reflect the updating of the information structure according to the task processed; and
sending the updated hierarchical list to the user device to update the displayed hierarchical list.

2. The method of claim 1, further comprising: creating the information structure to comprise one or multiple groups (pools) by storing information obtained from a plurality of computing devices on a network, where each pool comprising information of one or more of the computing devices, including Internet Protocol (IP) address, name, type, and resources information of each computing device.

3. The method of claim 2, comprising: constructing the one or more pools automatically by utilizing group identifier (ID) in a packet received from each computing device during a booting process.

4. The method pf claim 2, comprising: updating the information structure in response to an administrator through the hierarchical list displayed on a console device to perform a task for monitoring status, shutting down, or rebooting of a computing device in one of the pools.

5. The method of claim 4, comprising: updating the information structure in response to an administrator through the hierarchical list displayed on a console device to perform a task for creating, deleting or split a storage volume, for combining storage volumes, or for listing storage volumes for managing storages in a storage service pool among the one or more pools.

6. The method of claim 5, further comprising: updating the information structure in response to tasks performed through the hierarchical list for serialized operations including to create storage volumes for storage devices in the storage pool, create a file system on a created storage volume, mount the file system, create a folder structure on the file system, and setup access control for the created folder structure.

7. The method of claim 2, further comprising: forming at least a storage service pool, a file or content service pool, or a video service pool.

8. The method of claim 1, comprising: creating the hierarchical list with one or more nodes, associating at least one of the nodes with operation menu and each node with attributes of a resource item (object), including name, type, level and/or size of the resource item in the information structure to facilitate accessing a corresponding resource item in the computing devices.

9. The method of claim 8, wherein said sending the hierarchical list further comprises: encoding the hierarchical list into a web page according to the attributes and operation menu associated with each node to reflect characteristic of the resource item in the information structure before sending the hierarchical list.

10. The method of claim 1, comprising: updating the hierarchical list in the memory by adding or deleting one or more nodes in response to a task submitted through the hierarchical list by a user when the user navigating the list for accessing one or more levels of resource items in the information structure.

11. The method of claim 10, comprising: creating one or more processes/threads for processing each of tasks of accessing a resource item submitted via the hierarchical list, and facilitating each of the one or more processes/threads to share the dynamically updated hierarchical list with a consistent view during a user session.

12. The method of claim 1, further comprising: creating the information structure to comprise a folder structure with two or more levels of subfolders to facilitate user navigating the hierarchical list to perform a task of copying or moving a data object of a file, subfolder, or message from one folder into another folder.

13. The method of claim 12, comprising: updating the folder structure in response to the task submitted through the hierarchical list for copying or moving a data object from one folder into another, or to a task of creating, renaming, deleting, or sharing a file or folder in the folder structure.

14. The method of claim 1 comprising: causing displaying of the hierarchical list on the user device when the user log on the control device for staring a user session and deleting the hierarchical list from the memory in response to the user exiting from the user session.

15. A control device comprising:
at least one hardware processor and
one computer-readable storage device comprising program instructions which, when executed by the at least one hardware processor, configures the control device for supporting remotely access information structure, the program instructions comprising:
program instructions for creating a hierarchical list in memory to mirror an information structure in a reduced form;
program instructions sending the hierarchical list to a remote user devices for being displayed thereon;
program instructions for processing a task in response to a user through the hierarchical list displayed on the user device performing the task for accessing the information structure that comprise:
program instructions for updating the information structure and updating the hierarchical list in the memory to reflect the updated information structure according to the task processed; and
program instruction for sending the updated hierarchical list to the user device to update the displayed hierarchical list.

16. The control device of claim 15, comprising program instructions for creating the hierarchical list with one or more nodes, program instructions for associating each node with attributes including name, type, level and/or size of a resource item (object) in the information structure for facilitating accessing the actual resource item in the computing devices, and program instructions for associating at least one of the nodes with operation menu; and
program instructions for encoding the hierarchical list into a web page according to the attributes and operation menu associated with each node to reflect characteristic of the resource item in the information structure and program instructions for sending the hierarchical list via the page to the user device for displaying in a browser; and
program instructions for updating the hierarchical list in the memory by adding or deleting one or more nodes in response to a task submitted by a user through when navigating the hierarchical list for accessing one or more levels of resource items in the information structure.

17. The control device of claim 15, further comprising program instructions for creating an information structure to comprise one or multiple groups (pools) by storing information obtained from a plurality of computing devices on a network, where each pool comprising information of one or more of the computing devices, including Internet Protocol (IP) address, name, type, and/or resources information on each computing device; and program instructions for constructing the one or more pools automatically by utilizing group identifier (ID) in a packet received from each computing device during a booting process.

18. The control device of claim 17, comprising program instructions for: updating the one or more pools in response to an administrator through the hierarchical list displayed on a console device to perform a task for creating, deleting or split a storage volume, for combining storage volumes, or for listing storage volumes for managing storages in a storage service pool of the one or more pools or
to perform a task for monitoring status, shutting down, or rebooting of a computing device in one of the pools, or
to perform tasks for serialized operations including to create storage volumes for storage devices in a storage pool, create a file system on a created storage volume, mount the file system, create a folder structure on the file system, and setup access control for the folder structure.

19. The control device of claim 15, further comprising program instructions for creating an information structure to comprise a folder structure with two or more levels of subfolders to facilitate user navigating the hierarchical list to perform a task of copying or moving a data object of a file, subfolder, or message from one folder into another folder.

20. The control device of claim 19, comprising program instructions for: updating the folder structure in response to the task submitted through the hierarchical list for copying or moving a data object from one folder into another, or in response to a task of creating, renaming, deleting, or sharing a file or folder in the folder structure.

* * * * *